United States Patent [19]

Goldrian et al.

[11] Patent Number: 4,566,019

[45] Date of Patent: Jan. 21, 1986

[54] METHOD OF DRIVING ELECTRODES IN AN ELECTROEROSION PRINTER

[75] Inventors: Gottfried Goldrian, Boeblingen; Volker Rudolph, Aidlingen, both of Fed. Rep. of Germany

[73] Assignee: International Business Machines Corp. (IBM), Armonk, N.Y.

[21] Appl. No.: 586,905

[22] Filed: Mar. 9, 1984

[30] Foreign Application Priority Data

Mar. 15, 1983 [EP] European Pat. Off. ....... 83 102548.1

[51] Int. Cl.⁴ .............................................. G06K 15/10
[52] U.S. Cl. ...................................... 346/163; 346/1.1
[58] Field of Search .............. 346/162, 163, 151, 1.1, 346/76 R, 76 PH; 214/216, 383, 384; 400/124, 120

[56] References Cited

FOREIGN PATENT DOCUMENTS 1548595 12/1970 Fed. Rep. of Germany ...... 346/163

Primary Examiner—E. A. Goldberg
Assistant Examiner—A. Evans
Attorney, Agent, or Firm—Bell, Seltzer, Park & Gibson

[57] ABSTRACT

The invention concerns a method and a circuit arrangement for electrically driving print electrodes in an electroerosion printer by means of driver stages producing relatively strong and relatively short ignition pulses as well as by means of driver stages producing relatively weak burning pulses which are of longer duration than the ignition pulses. The burning pulse is first initiated and if an arc is struck, the ignition pulse is not required. Use of the burning pulse alone produces a sharp edge printing mark. Only if the burning pulse is unable to strike an arc is the ignition pulse delivered to assure that printing occurs.

4 Claims, 3 Drawing Figures

METHOD OF DRIVING ELECTRODES IN AN ELECTROEROSION PRINTER

FIELD OF THE INVENTION

This invention relates to the field of electroerosion printers and particularly to the control of electrical drive pulses delivered to the print electrodes.

BACKGROUND OF THE INVENTION

European Patent Application No. P 82 012 511.1 describes a form of electrical drive pulse control providing two current pulses of different strengths.

German Pat. No. 22 15 519 refers to a method of recording image information on electrosensitive paper, in particular recording metal paper, using a group of individually controllable print electrodes, wherein the on period of each print electrode is selected to be shorter than the time after which the burning process would cease of its own accord. This patent also discloses halftone recording by changing the density such that the selected on period of the individual print electrodes during the burning process is shorter or longer. Finally, German Offenlegungsschrift No. 30 40 153 discloses a method of recording halftones of different brilliance on an electrosensitively coated record carrier by means of print electrodes, wherein the differences in the halftones are generated by modulating the areas of the individual picture elements, and wherein the picture elements are produced by modulating the electric pulses, the duration of the pulses being modulated in the manner disclosed in the aforementioned patent.

In principle, these latter two methods use only one strong current pulse in response to which the arc necessary for burning a mark is invariably struck. Before the end of the burning process, this pulse has to be switched off. However, such methods are poorly suited for extremely high resolutions.

SUMMARY OF THE INVENTION

High-resolution electroerosion printers generally require only a small percentage of strong ignition pulses, provided that the printer is suitably adjusted and a good quality metal paper is used. Ignition pulses which are not required adversely affect the print quality. The reason for this is that too high a power causes the respective picture element to be explosively eroded. Although the ignition contributes to about 20 percent of the picture element finally printed, the precision of the picture element would be much greater if the burning process could be triggered by a low current. Therefore, it is the object of the invention to avoid strong ignition pulses unless this is necessary for the actual ignition. This object, in accordance with the invention, is accomplished in that the respective burning pulse driver stage is actuated first and the ignition pulse driver stage is actuated with a relatively short delay, and that after the burning pulse has triggered the ignition during this time interval, the current drop across the arc struck between electrode and record carrier prevents the ignition pulse driver stage from being actuated. This is best accomplished in that the delay of the pulse triggering the ignition pulse driver stage is less than 0.2, preferably about 0.1, times the duration of the ignition pulse. A circuit arrangement for implementing the method according to the invention is characterized in that the trigger pulse for the ignition pulse driver stage is delayed slightly over the trigger pulse for the burning pulse driver stage, and that a unilaterally conductive device is connected between the output of the burning pulse driver stage and the output of the ignition pulse driver stage, said device being inhibited by the voltage drop occurring across the arc struck between the electrode and by the burning voltage that still exists.

One way of carrying out the invention will be described in detail below, with reference to the drawings which illustrate only one specific embodiment, in which

DESCRIPTION OF THE INVENTION

In the case of the known methods and circuit arrangements, the ignition pulse is applied first. This pulse strikes the arc between electrode and metal paper through the ignition pulse driver stages. Ignition is effected at a relatively low voltage but with a relatively strong current pulse of short duration. The burning process thus triggered necessitates a higher voltage but is effected at a relatively low current to cease of its own accord after a short time, say about 3 $\mu s$.

Figure 1A:
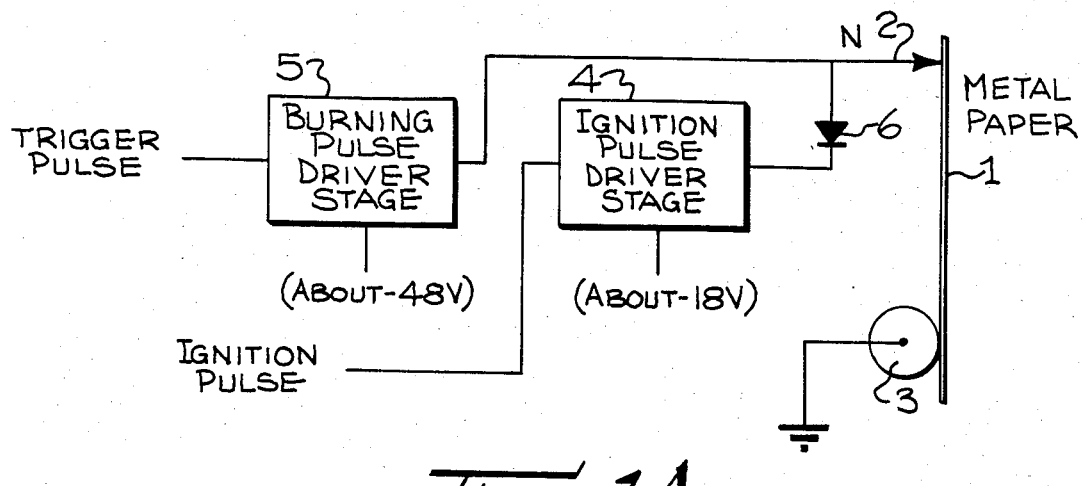
FIGS. 1A, 1B show a basic circuit diagram of the new circuit arrangement and the pulses relative to each other
Figure 1B:
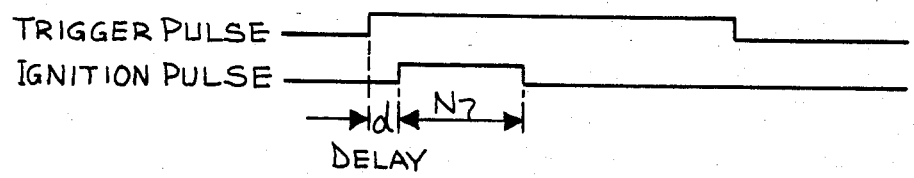

The circuit arrangement for the method in accordance with the invention will be described briefly below. In an electroerosion printer, a metal-coated record carrier, preferably a metal paper 1, is used on which one or several electrodes 2 are supported. The metal paper is grounded through a roll 3. An ignition pulse driver stage 4 is provided which is triggered by an ignition pulse. In addition, a burning pulse driver stage 5 is provided which is also pulse-triggered. A unilaterally conductive device, for example a diode 6, is connected between the output of the burning pulse driver stage and the ignition pulse driver stage. According to the new method, the trigger pulse for the burning pulse driver stage is applied first, as shown in FIG. 1B. If the burning pulse is capable of striking an arc, the voltage between the electrode and the metallic coating of the metal paper becomes more negative than the ignition voltage, provided that the ignition pulse is applied to the ignition pulse driver stage with a delay d. In this case, there is no ignition current flow, as the decoupling diode 6 inhibits the output of the ignition pulse driver stage. If the burning pulse driver stage fails to trigger an ignition within the delay period d, the ignition pulse triggers the ignition pulse driver stage which in turn causes the arc to be struck in the usual manner between electrode and metal paper. This means that the delay of the ignition pulse must be sufficiently long to permit the burning pulse driver stage to switch and trigger an ignition process.

Figure 2:
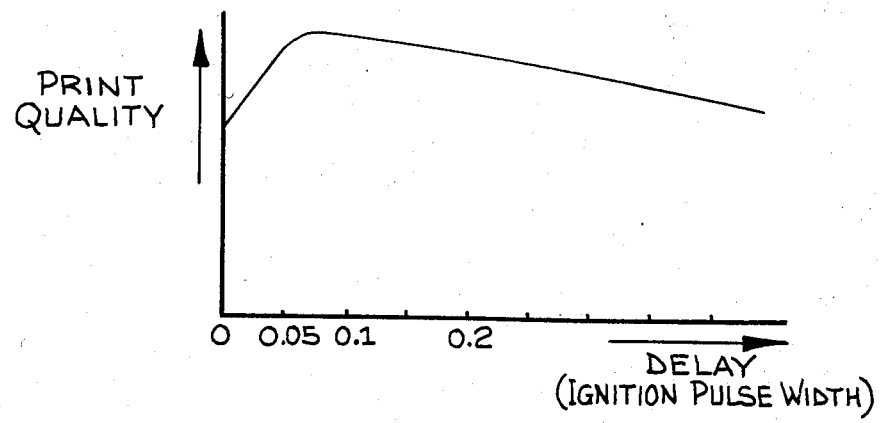
FIG. 2 shows the dependence of the print quality on the delay in fractions of the ignition pulse width.

For obtaining maximum results with the delayed ignition pulse, the delay between the trigger pulses for the burning and the ignition process must be suitably selected. The delay must be sufficiently long to permit the burning pulse driver stage to trigger the burning process of a picture element. If the necessary delay is much greater than a tenth of ignition pulse width, it is more complicated to select the appropriate delay period. As a delayed start reduces the burning time, the quality of the individual picture elements and thus the print quality, although increasing initially, will decrease after the delay has reached about ¼ of the ignition pulse width. This is shown clearly in FIG. 2. The shape of the curve illustrated in this figure depends on many process parameters, such as paper quality, pressure exerted by the electrodes, etc. Thus the curve maximum may be shifted to the right or the left by changing the individual parameters. However, extensive tests have shown that best results are currently obtained with a delay d amounting to 0.1 times the duration of the ignition pulse.

What is claimed is:

1. The method of operating a print electrode in an electroerosion printer, comprising the steps of:

applying a first trigger pulse to a first power source for applying to the electrode of a first power pulse having a high maximum voltage and a limited maximum current, and applying, after a time delay but during the continuation of the first trigger pulse, a second trigger pulse to a second power source for applying to the electrode a second power pulse having a lower maximum voltage and a less limited maximum current than the first power pulse, the second power pulse being applied to the electrode only in the event that an arc has not been struck by the first pulse.

2. The method according to claim 1 wherein the delay time is less than 0.2 times the duration of said high current pulse.

3. The method according to claim 2 wherein the delay time is approximately 0.1 times the duration of said high current pulse.

4. A circuit for operating a print electrode of an electroerosion printer comprising:

means for supplying a trigger pulse having a predetermined duration, means for supplying an ignition pulse of shorter duration than the trigger pulse and in a time delayed relationship with respect to each trigger pulse, but during the continuation of each trigger pulse, an output conductor connected to the print electrode, first driver stage means operable upon receipt of a trigger pulse for delivering a high voltage, low current pulse to said output, second driver stage means operable upon receipt of an ignition pulse for delivering a relatively short duration, high current pulse to said output conductor, and a unidirectionally conductive device connected between said second stage driver and said output conductor, said device being oriented such that conduction therethrough is inhibited in the presence of a voltage on said output conductor during continuance of the low current pulse and the presence of an arc at said printing electrode.

* * * * *